(12) United States Patent
Chen et al.

(10) Patent No.: US 9,287,699 B2
(45) Date of Patent: Mar. 15, 2016

(54) BYPASS CONTROL STRUCTURE OF LINK UNIT OF CHAIN CIRCUIT ACTIVE POWER FILTER AND METHOD

(71) Applicant: ZHUHAI WANLIDA ELECTRICAL AUTOMATION CO., LTD, Zhuhai, Guangdong (CN)

(72) Inventors: Junling Chen, Zhuhai (CN); Mingxing Huang, Zhuhai (CN); Huailin Yu, Zhuhai (CN); Chaoxian Huang, Zhuhai (CN); Chunyuan Su, Zhuhai (CN); Jie Li, Zhuhai (CN); Yanqing Wei, Zhuhai (CN); Guodong Sa, Zhuhai (CN)

(73) Assignee: ZHUHAI WANLIDA ELECTRICAL AUTOMATION CO., LTD, Zhuhai (CN)

( * ) Notice: Subject to any disclaimer, the term of this patent is extended or adjusted under 35 U.S.C. 154(b) by 0 days.

(21) Appl. No.: 14/421,447

(22) PCT Filed: Feb. 21, 2013

(86) PCT No.: PCT/CN2013/071743
§ 371 (c)(1),
(2) Date: Feb. 13, 2015

(87) PCT Pub. No.: WO2014/101343
PCT Pub. Date: Jul. 3, 2014

(65) Prior Publication Data
US 2015/0214727 A1 Jul. 30, 2015

(30) Foreign Application Priority Data

Dec. 24, 2012 (CN) .......................... 2012 1 0565458

(51) Int. Cl.
*H02J 3/18* (2006.01)
*H02H 7/122* (2006.01)
(Continued)

(52) U.S. Cl.
CPC ................ *H02H 7/1225* (2013.01); *H02J 3/01* (2013.01); *H02J 3/18* (2013.01); *H02M 7/53871* (2013.01); *Y02E 40/22* (2013.01); *Y02E 40/26* (2013.01); *Y02E 40/30* (2013.01); *Y02E 40/40* (2013.01)

(58) Field of Classification Search
CPC . H02M 7/53871; H02M 1/42; H02M 1/4216; H02M 1/4233; H02M 2001/42; H02M 2001/4275; H02M 1/12; H02H 7/1225; H02J 3/01; H02J 3/18
USPC .......................................... 323/205, 207, 209
See application file for complete search history.

(56) References Cited

U.S. PATENT DOCUMENTS 5,642,275 A * 6/1997 Peng ........................ H02M 7/49
363/137

(Continued)

FOREIGN PATENT DOCUMENTS

| CN | 2785249 Y | 5/2006 |
|---|---|---|
| CN | 101478226 A | 7/2009 |

(Continued)

OTHER PUBLICATIONS

F. Z. Peng and J. S. Lai et al, A Multilevel Voltage-Source Inverter with Separate DC Source for Static Var Generation, IEEE Transactions on Industry Applications, 1996, 32(5):1130-1138.

*Primary Examiner* — Matthew Nguyen
*Assistant Examiner* — Kyle J Moody

(57) ABSTRACT

The present application relates to a bypass control structure of a link unit of a chain circuit active power filter and a control method thereof. The bypass control structure includes a main controller, a chain circuit multilevel inverter and a reactor connected to an external electric network. The chain circuit multilevel inverter generally comprises multiple levels of link units. A state of the switch means in each link unit in a chain circuit active power filer is detected in real time, and types of detected faults are classified so as to bypass the fault of the link unit with fault by utilizing the control of the switch means without fault in the link unit with fault. Normal operating, stability, reliability, high efficiency of the active power filter are ensured. Therefore, the problem that the operation must be suspended until the fault is eliminated is solved without any additional bypass means.

8 Claims, 9 Drawing Sheets

(51) Int. Cl.
*H02J 3/01* (2006.01)
*H02M 7/5387* (2007.01)

(56) References Cited

U.S. PATENT DOCUMENTS

| | | | | |
|---|---|---|---|---|
| 7,710,082 | B2* | 5/2010 | Escobar Valderrama | H02J 3/1857 323/207 |
| 7,969,238 | B2* | 6/2011 | Bernhard | H02J 3/1857 327/552 |
| 8,503,202 | B2* | 8/2013 | Chimento | H02J 3/18 363/56.03 |
| 2014/0103887 | A1* | 4/2014 | Akagi | H02J 3/1857 323/207 |

FOREIGN PATENT DOCUMENTS

| | | |
|---|---|---|
| CN | 101478228 A | 7/2009 |
| CN | 101951134 A | 1/2011 |
| CN | 102064555 A | 5/2011 |
| CN | 201956689 U | 8/2011 |

* cited by examiner

BYPASS CONTROL STRUCTURE OF LINK UNIT OF CHAIN CIRCUIT ACTIVE POWER FILTER AND METHOD

TECHNICAL FIELD

The present application belongs to the field of reactive power compensation and harmonic suppression technology for power system and relates to a bypass control structure of a link unit of a chain circuit active power filter and method.

BACKGROUND

With development of power electronic technology, various non-linear power electronic instruments are widely used in electric power system, industry (particularly, metallurgy, steel, chemical industry or the like), traffic, building automation and family, and are increased in capability and control manners, which enhances waveform distortion of the voltage and the current, and thus harmonic pollution in the electric power network is increasingly severe. For reactive power compensation and harmonic suppression in the electric power network, a passive power filter (PPF) is used both at home and abroad, which has a simple structure, low cost and good filtering effect on specific harmonic. For example, on a power supplying network of industry such as metallurgy and metal, a PPF is mounted, which has the capacity from several MVAs to dozens of MVAs. The PPF improves the electric power quality, but the filtering effect thereof is greatly affected by the resistance and the parameters of the electric power network and it tends to resonate with the electric power network impedance which influences the safety of power supply. In order to overcome the disadvantages of the PPF, an active power filter (APF) becomes a hotspot of research and application. Compared with the PPF, the APF has the following advantages and disadvantages:

1. The APF has various functions of compensation, which can compensate not only each subharmonic, but also dynamically compensate reactive power and negative sequence current or the like;
2. The filtering performance is not affected by the impedance of the electric power network, and will not resonate with the electric power network impedance;
3. The harmonic compensation performance is not affected by the change of frequency of the electric power network;
4. Dynamic harmonic suppressing is achieved, in which changes of the frequency and the amount of the harmonic can be quickly responded;
5. Since the device has limited output capability, even if the amount of the harmonic increase, the no over-loading phenomenon will occur;
6. With good cost performance, APF can achieve several harmonic controls;
7. One harmonic resource can be controlled at a time and several harmonic resources can be as well.

Due to the advantages and the characteristics of the APF, the APF becomes popular among users. Limited by current power electronic switch means, APF is generally used in harmonic control of a low voltage power supply system. For middle or high voltage, large capability harmonic control, a main circuit of APF generally requires series connection, parallel connection, multiple types and multilevel technology of a switch means. If the series connection and parallel connection of the switch means are used, problems of dynamic voltage balancing and current balancing are required to be solved. A transformer applied in a multiple technology has saturation and nonlinearity, which brings problems of complex control and difficult protection. Thus, improving capability of the APF by multilevel technology is an important research direction.

In 1996, F. Z. Peng and J. S. Lai et al. proposed a topological structure of a chain circuit multiple inverter in "*A Multilevel voltage-source inverter with separate DC source for Static Var Generation*" (IEEE Transactions on Industry Applications, 1996, 32(5):1130-1138.) The topological structure is used in an APF to constitute a chain circuit active power filter to significantly improve capability and withstand voltage level of the APF, and it is not required to increase a transformer to use in harmonic compensation of a middle or high voltage, large capability, nonlinearity laden, which has a wide application foreground.

A main circuit of a chain circuit APF is a chain circuit multilevel inverter. Each phase constitutes an independent chain, and the inverter is composed of multiple link units with the same structure. Each link unit can be composed of a single-phase full-bridge invert which can output three levels and control units thereof. With increasing levels of the link units, the capability and dielectric strength of the device increases. However, use of multiple switch means may increase probability of fault, thus it is necessary to increase redundant link units. If the number of the link units is less than or equal to that of the redundant link units, the link unit with fault can be bypassed. Then the device can continue to operate, which improves availability and reliability of the device. Therefore, there is an urgent need to design a simple economic reliable bypass structure.

Chinese patent 201010624231.1 and Chinese patent 201020700497.5 provide a chain circuit STATCOM link unit bypass structure with a mechanical switch, in which a special mechanical switch is applied as a bypass structure of a link unit. The circuit structure is simple and includes little elements and is easy to operate. Chinese patent 201010261610.9 provides a bypass structure where a contactor is utilized as a link unit of a transducer. Chinese patent 200520050490.2, 200810113842.2 and 200810113844.1 use controllable silicon as a bypass structure of the link unit. The above bypass structures all add a link unit bypass by adding a power means, which increases cost and volume. Furthermore, since a contactor or controllable silicon is used as an actuating means of the bypass, achieving the function of bypass takes more time.

SUMMARY

In order to solve the problems in the prior art, the present application provides the bypass control structure of a link unit of a chain circuit active power filter and the controller method is based on such control structure. By the structure and the method, a bypass control can be performed on a link unit, and the structure has stable and reliable performance, high availability and reduced cost and volume and takes less time on performing the bypass function.

In order to solve the above technical problems, the present application provides following technical solutions:

A bypass control structure of a link unit of a chain circuit active power filter, including a main controller, a chain circuit multilevel inverter for generating compensation voltage is adapted to control a link unit bypass thereof, and a reactor for generating compensation current and connected to an external electric network; wherein the chain circuit multilevel inverter generally includes two or more levels of link units; each link unit has a unit controller, a fault detect circuit, a single-phase full-bridge inverter, a DC/DC power supply and a DC coupling circuit; the unit controller is connected to the main controller via an optical fiber and is connected to the fault detect circuit and the single-phase full-bridge inverter; an input end of the DC coupling circuit is electrically connected to two DC voltage sides of the link unit in which the DC coupling circuit is located, and is connected to two DC voltage sides of an adjacent link unit; an input end of the DC/DC power supply is electrically connected to an output end of the DC coupling circuit, and an output end of the DC/DC power supply is electrically connected to the unit controller for supplying working power for each component.

Further, the single-phase full-bridge inverter generally includes four switch means S1 to S4, four diodes D1 to D4 and a capacitor C; S1 and S3 are respectively connected to S2 and S4 in series; S1 and S2 connected in series are connected to S3 and S4 connected in series in parallel, and S1 to S4 are connected to D1 to D4 in antiparallel in turn, respectively; wherein an end at which a collector of S1 is connected to a cathode of D1 is referred to as a P end, an end at which an emitter of S2 is connected to an anode of D1 is referred to as a M end, a middle point of a series circuit including S1 and S2 and the antiparallel diodes D1 and D2 thereof is referred to as a U end, a middle point of a series circuit including S3 and S4 and the antiparallel diodes D3 and D4 thereof is referred to as a V end, and the P end and the M end are respectively connected to a positive end of C and a negative end of C, while the P end and the M end together with the U end and the V end are connected to the fault detect circuit.

Further, the fault detect circuit includes a first, second, third and fourth which have the same circuit structures. Each of the detect unit generally includes a photoelectric isolation module, four diodes D5 to D8, four resistors R1 to R4 and two capacitors C1 and C2; the diode D5, the diode D6, the resistor R1 and the resistor R3 are conductively connected to a first input end of the photoelectric isolation module, and a second input end of the photoelectric isolation module is conductively connected to the diode D8; both ends of the resistor R2, the diode D7 and the capacitor C1 are conductively connected to each of the first and second input ends of the photoelectric isolation module and are connected in parallel, and one end of each of the resistor R2 and the diode D7 is connected between the resistor R1 and the resistor R3; one end of the capacitor C1 is connected between the resistor R3 and the first input end of the photoelectric isolation module; a first output end of the photoelectric isolation module is conductively connected to the resistor R4 and a second output end thereof is connected to a negative end of a working power supply of 5V; the two ends of the capacitor C2 are conductively connected to the first and second output ends of the photoelectric isolation module, respectively; wherein an input end of the first detect unit is conductively connected to the P end and the U end of the single-phase full-bridge inverter, an input end of the second detect unit is conductively connected to the U end and the M end of the single-phase full-bridge inverter; an input end of the third detect unit is conductively connected to the P end and the V end of the single-phase full-bridge inverter, an input end of the fourth detect unit is conductively connected to the V end and the M end of the single-phase full-bridge inverter, and output ends of the first, second, third and fourth end are respectively a F1 end, a F2 end, a F3 end and a F4 end and are connected to the unit controller.

Further, the DC coupling circuit includes two sets of diodes in which two diodes positively connected in series are connected in parallel to two diodes positively connected in series, and two sets of diodes in which two diodes negatively connected in series are connected in parallel to two diodes positively connected in series; wherein input ends of the two sets of diodes in which the two diodes positively connected in series are connected in parallel to the two diodes positively connected in series are respectively conductively connected to the P end of the single-phase full-bridge inverter of the link unit in which such two sets of diodes are located and a P' end of the single-phase full-bridge inverter of the adjacent link unit, while output ends thereof are both conductively connected to a $V_{1+}$ input end of the DC/DC power supply of the link unit in which such two sets of diodes are located; and input ends of the two sets of diodes in which the two diodes positively connected in series are connected in parallel to the two diodes positively connected in series are respectively conductively connected to the M end of the single-phase full-bridge inverter of the link unit in which such two sets of diodes are located and a M' end of the single-phase full-bridge inverter of the adjacent link unit, while output ends thereof are both conductively connected to a $V_{1-}$ input end of the DC/DC power supply of the link unit in which such two sets of diodes are located.

Further, the DC coupling circuit includes three sets of diodes where each set of diode consists of three diodes positively connected in series and the three sets are connected in parallel; three sets of diodes where each set of diode including three diodes negatively connected in series and the three sets are connected in parallel; wherein input ends of the three sets of diodes in which each set of diode including three diodes positively connected in series and the three sets are connected in parallel are respectively conductively connected to the P end of the single-phase full-bridge inverter of the link unit in which such three sets of diodes are located and a P' end and a P''' end of the single-phase full-bridge inverters of the two adjacent link units, while output ends thereof are all conductively connected to a $V_{1+}$ input end of the DC/DC power supply of the link unit in which such three sets of diodes are located; and input ends of the three sets of diodes in which each set of diodes including three diodes negatively connected in series and the three sets are connected in parallel are respectively conductively connected to the M end of the single-phase full-bridge inverter of the link unit in which such three sets of diodes are located and a M' end and a M'' end of the single-phase full-bridge inverters of the two adjacent link units, while output ends thereof are all conductively connected to a $V_{1-}$ input end of the DC/DC power supply of the link unit in which such three sets of diodes are located.

The present application describes a control method for a chain circuit active power filter link unit bypass control structure. As for the method, a state of the switch means in each link unit 21 in a chain circuit multilevel inverter of a chain circuit active power filter is detected in real time, and types of detected faults are classified, so as to bypass the fault of the link unit 21 with fault by utilizing the control of the switch means without fault in the link unit 21 with fault.

The method includes the following steps a. The fault detect circuit detecting, in real time, the state of the switch means of the single-phase full-bridge invert in the link unit in which the fault detect circuit is located;

b. The unit controller of the link unit with fault determining information of the faults detected by the fault detect circuit and classifying types of the faults;

c. The main controller sending a corresponding bypass control demand according to the classified faults reported by the unit control unit of the fault link unit;

d. The unit controller of the fault link unit with fault appropriately controlling the switch means of the single-phase full-bridge invert to be ON according to the bypass control command sent by the main controller, so as to short the output of the single-phase full-bridge invert of the fault link unit with fault to bypass the fault link unit with fault.

Further, the unit controller of the fault link unit with fault appropriately controlling the switch means of the single-phase full-bridge invert to be ON according to the bypass control command sent by the main controller, specifically is that the unit controller of the fault link unit with fault sands a switch signal to the switch means without fault in the single-phase full-bridge invert according to the bypass control command sent by the main controller, to switch on S1 and S3, or switch on S2 and S4, thus shorting the output and achieving the bypass control.

The present application provides the following beneficial effects:

According to the technical solution of the present application, by the bypass control structure of a link unit of a chain circuit active power filter and the controller method based on such control structure, if a short or open fault or other specific fault occurs in any of the switch means, a bypass control can be performed in the link unit in which the switch means with fault is located to ensure normal operating, stability, reliability, high efficiency of the active power filter. Therefore, the problem that the operation must be stopped until the fault is eliminated is solved without any additional bypass means, the cost and the volume are reduced and it is achieved that the time required to bypass is less than the time required to bypass by using a contactor and controllable silicon. The control method according to the present application is not only adapted to detect short or open fault of a switch means, but also is adapted to other application situation of a chain circuit multilevel convertor, for example a bypass control of a link unit, such as a synchronous compensator (STATCOM), a static var generator (SVG), a transducer or the like.

DETAILED DESCRIPTION

Figure 1:
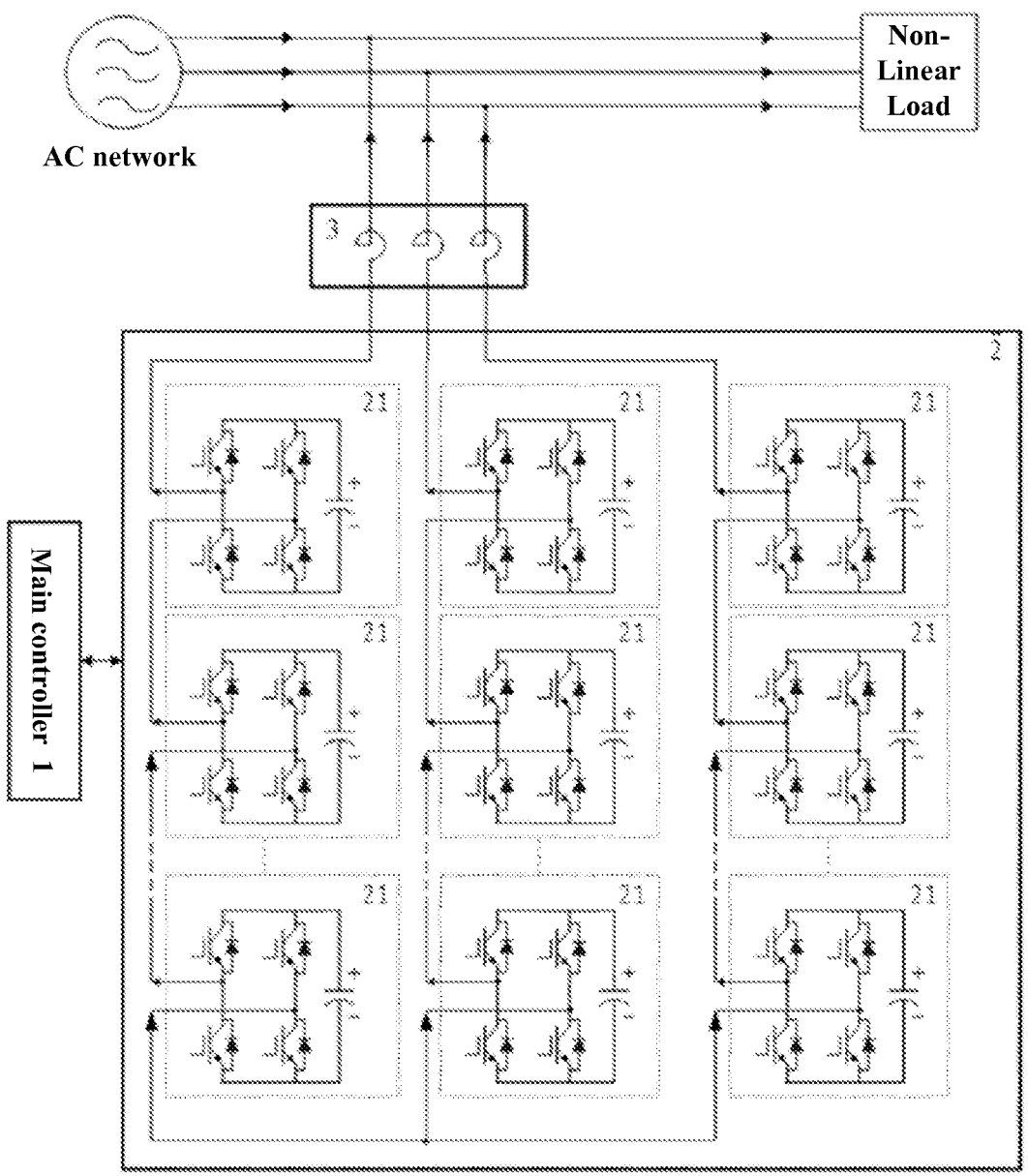
FIG. 1 is a schematic structural view of an embodiment of a bypass control structure of a link unit of a chain circuit active power filter according to the present application.
Figure 2:
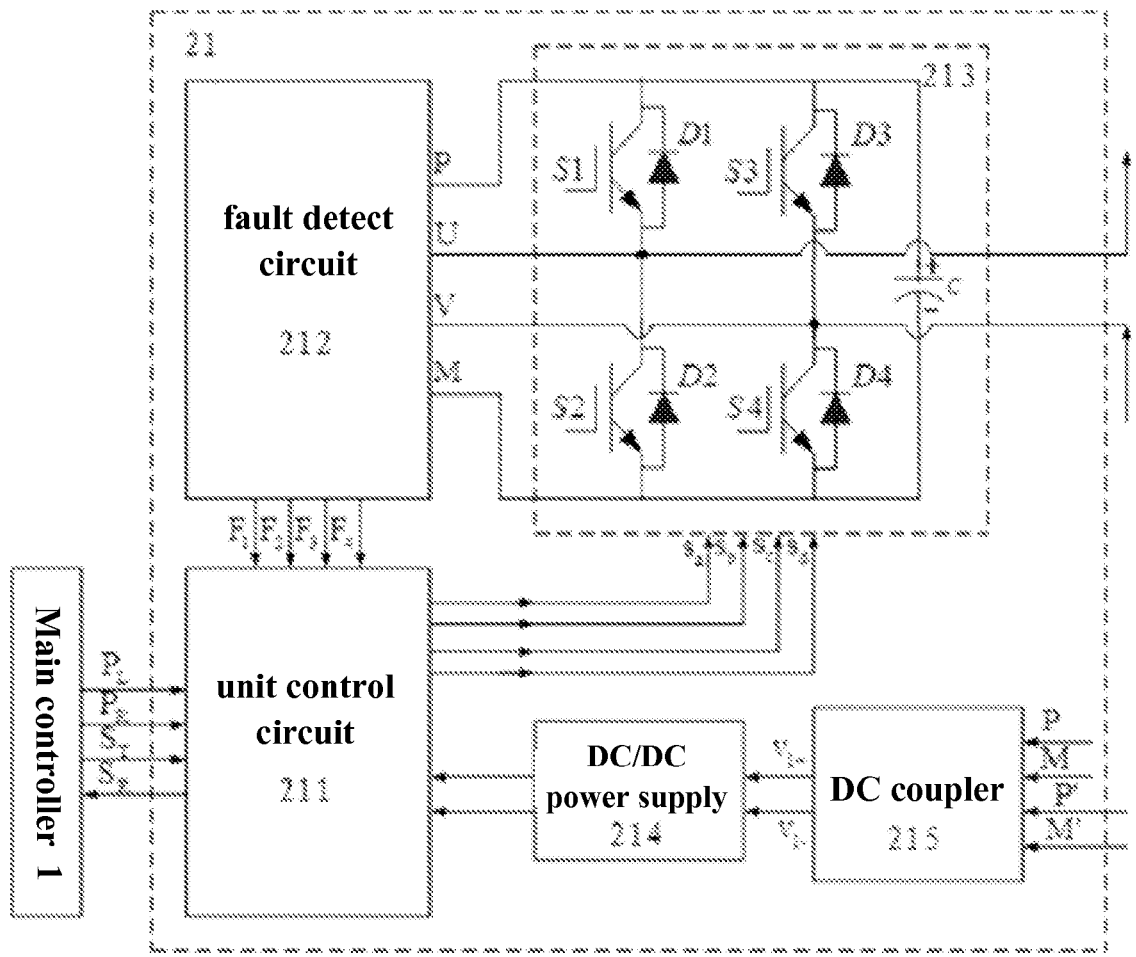
FIG. 2 is a schematic structural view of a link unit and a main controller in the embodiment of the bypass control structure of the link unit of the chain circuit active power filter according to the present application.
Figure 3:
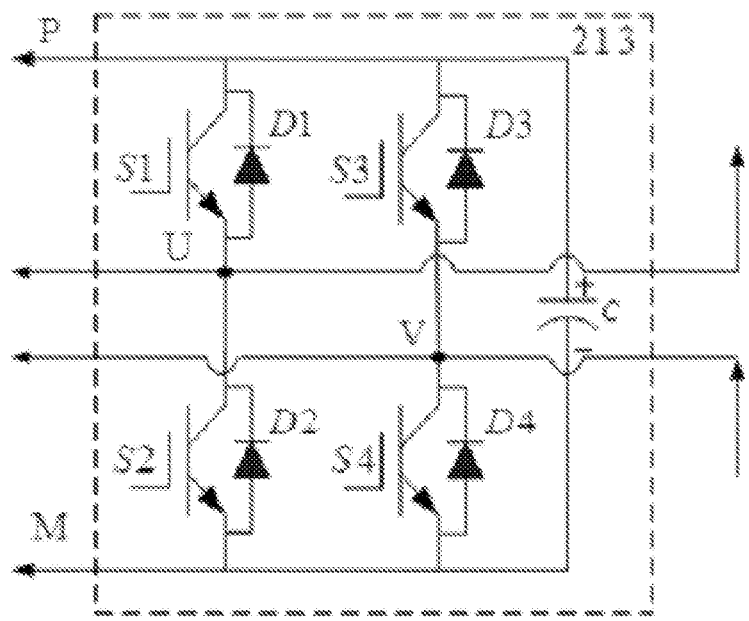
FIG. 3 is a schematic structural view of a single-phase full-bridge invert in the embodiment of the bypass control structure of the link unit of the chain circuit active power filter according to the present application.
Figure 4:
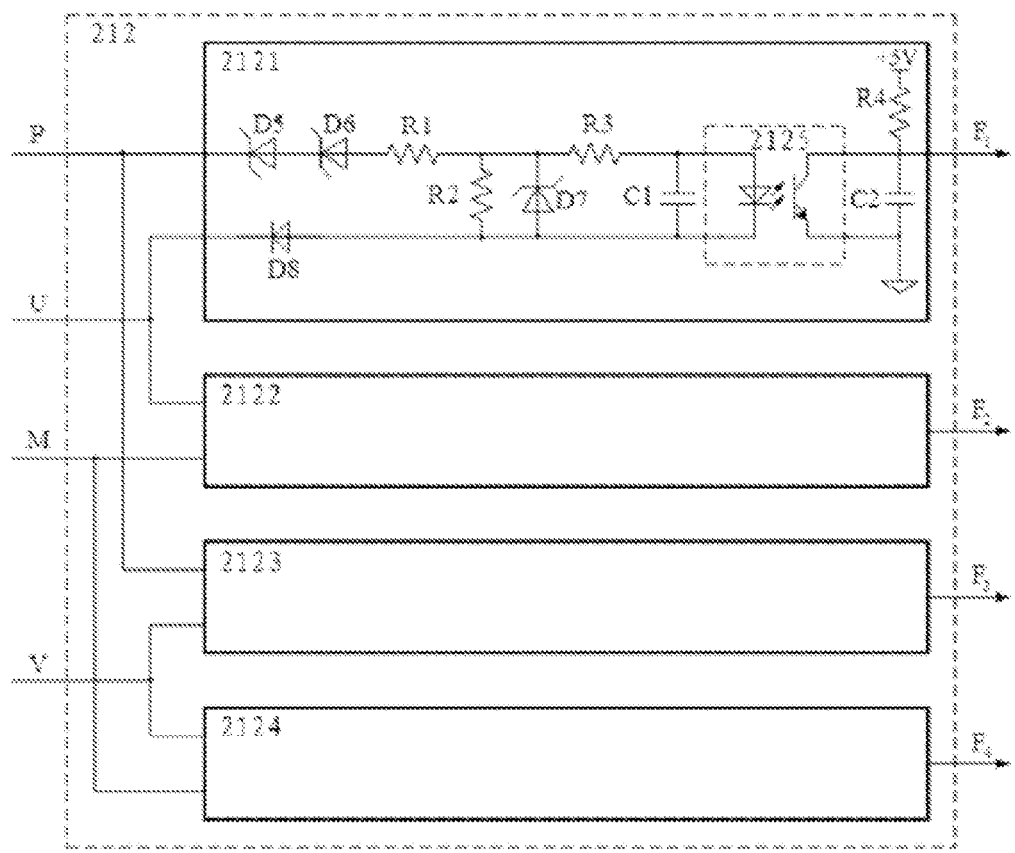
FIG. 4 is a schematic structural view a fault detect circuit in the embodiment of the bypass control structure of the link unit of the chain circuit active power filter according to the present application.
Figure 5:
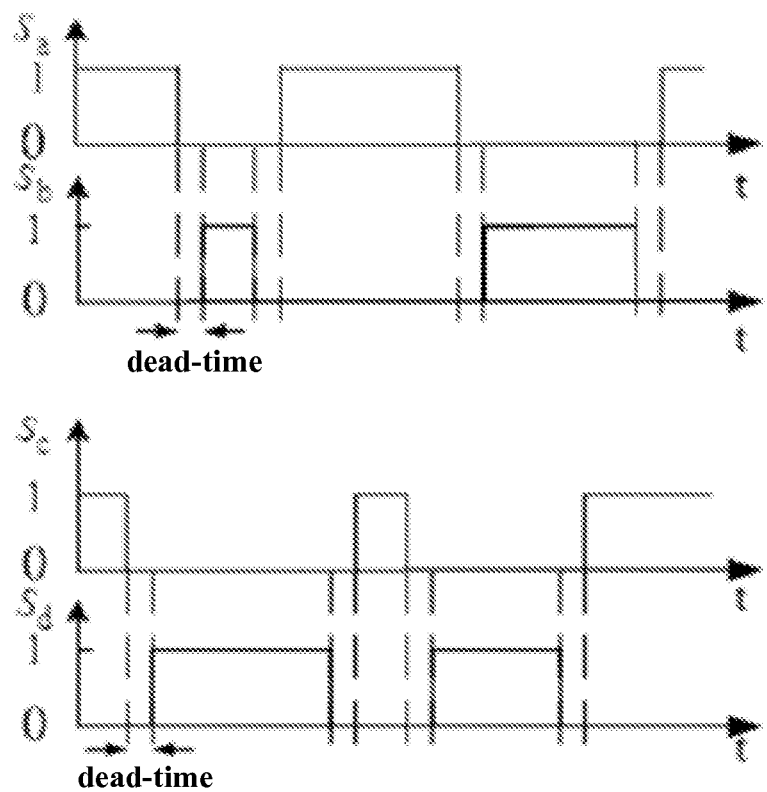
FIG. 5 is a waveform graph of a gate trigger information of the single-phase full-bridge invert in the embodiment of the bypass control structure of the link unit of the chain circuit active power filter according to the present application.

In order to make the object, the technical solution and the advantages of the present application, the present application will be further described in detail in conjunction with accompanying drawings and embodiments. It is hoped that the embodiment described herein is only used to explain the present application, not to limit it.

As shown in FIGS. 1, 2, 3 and 5:

An embodiment of the present application provides a bypass control structure of a link unit of a chain circuit active power filter mainly including a main controller 1, a chain circuit multilevel inverter 2 for generating compensation voltage and adapted to control a link unit bypass thereof, and a reactor 3 for generating compensation current and connected to an external electric network. According to requirement on power network reactive power compensation and harmonic treatment, the multilevel inverter 2 generates a compensation voltage. After the compensation voltage passes through the reactor 3, a compensation current is generated. The current is injected into the power network for compensating reactive current and harmonic current required for the power network. The chain circuit multilevel inverter 2 generally includes two or more levels of link units 21; the link units 21 each has a unit controller 211, a fault detect circuit 212, a single-phase full-bridge inverter 213, a DC/DC power supply 214 and a DC coupling circuit 215; the unit controller 211 is connected to the main controller 1 via an optical fiber and is connected to the fault detect circuit 212 and the single-phase full-bridge inverter 213; an input end of the DC coupling circuit 215 is electrically connected to two DC voltage sides of the link unit 21 in which the DC coupling circuit 215 is located, and is connected to two DC voltage sides of an adjacent link unit 21; an input end of the DC/DC power supply 214 is electrically connected to an output end of the DC coupling circuit 215, and an output end of the DC/DC power supply 214 is electrically connected to the unit controller 211 for supplying working power for each components.

The single-phase full-bridge inverter (213) described in the embodiment of the present application generally includes four switch means S1 to S4, four diodes D1 to D4 and a capacitor. S1 to S4 are all IGBT tubes. S1 and S3 are respectively connected to S2 and S4 in series; S1 and S2 connected in series are connected to S3 and S4 connected in series in parallel, and S1 to S4 are connected to D1 to D4 in antiparallel in turn, respectively; wherein an end at which a collector of S1 is connected to a cathode of D1 is referred to as a P end, an end at which an emitter of S2 is connected to an anode of D1 is referred to as a M end, a middle point of a series circuit including the switch means S1 and the switch means S2 and the antiparallel diodes D1 and D2 thereof is referred to as a U end, a middle point of a series circuit including the switch means S3 and the switch means S4 and the antiparallel diodes D3 and D4 thereof is referred to as a V end, and the P end and the M end are respectively connected to a positive end of the capacitor C and a negative end of the capacitor C, while the P end and the M end together with the U end and the V end are connected to the fault detect circuit 212.

According to the present application, during operating, $P_L$ sent by the main controller 1 to the unit controller 211 represents a switch signal of the switch means S1 in the single-phase full-bridge inverter 213. After passing through the driving circuit of the switch means in the unit controller 211, a gate triggering signal $S_a$ is given; $P_R$ sent by the main controller 1 to the unit controller 211 represents a switch signal of the switch means S3 in the single-phase full-bridge inverter 213. After passing through the driving circuit of the switch means in the unit controller 211, a gate triggering signal $S_c$ is given. In order to avoid direct connection between the switch means S1 and the switch means S2 and between the switch means S3 and the switch means S4 in the single-phase full-bridge inverter 213, a dead-time and logic of the gate triggering signal $S_b$ of the switch means S2 and the gate triggering signal $S_d$ of the switch means S4 are introduced, wherein "1" represents the switch means is ON, "0" represents the switch means is OFF. The main controller 1 sends commands of operating, stop, bypass to the unit controller 211 in the form of data code via $S_T$; the unit controller 211 sends the information of open fault, short fault and DC voltage achieve voltage and under voltage of the switch means of the link unit 21 to the main controller 1 in the manner of data code via $S_R$.

As shown in FIGS. 4, 8 to 10:

The fault detect circuit 212 in the bypass control structure of the link unit of the chain circuit active power filter according to the embodiment of the present application includes a first detect unit 2121, a second detect unit 2122, a third detect unit 2123 and a fourth detect unit 2124 which have the same circuit structures; each of the detect units 2121 to 2124 generally includes a photoelectric isolation module 2125, four diodes D5 to D8, four resistors R1 to R4 and two capacitors C1 and C2; the photoelectric isolation module 2125 is a TLP521 or 6N137 chip, and the diode D5, the diode D6, the resistor R1 and the resistor R3 are conductively connected to one of input ends of the photoelectric isolation module 2125 in order. The diodes D5 to D7 are (unipolar or bipolar) transient voltage absorption tubes or voltage-regulator diodes, wherein the diodes D5 and D6 are used to cut off the voltage. Only the voltage applied on the circuit exceeds the voltage regulation values of the D5 and D6, the current flows through a light emitting diode in the photoelectric isolation module 2125. Another input end of the photoelectric isolation module 2125 is conductively connected to a diode D8 which is mainly used to avoid a reverse voltage from applying on the light emitting diode in the photoelectric isolation module 2125. Both ends of each of the resistor R2, the diode D7 and the capacitor C1 are respectively conductively connected to both input ends of the photoelectric isolation module 2125 and are connected to each other in parallel. One end of each of the resistor R2 and the diode D7 is connected between the resistor R1 and the resistor R3. The diode D7 is used to regulate voltage, to avoid an over high voltage between the two ends of the light emitting diode of the photoelectric isolation module 2125. One end of the capacitor C1 is connected between the resistor R3 and the input end of the photoelectric isolation module 2125. One output end of the photoelectric isolation module 2125 is conductively connected to the resistor R4 and the other output end thereof is connected to a negative end of a working power supply of 5V; the two ends of the capacitor C2 are conductively connected to the two output ends of the photoelectric isolation module 2125, respectively. The resistors R1 to R3 are current limiting and voltage dividing resistors which are mainly used to limit the current flowing through the light emitting in the photoelectric isolation module 2125. The resistor R4 is up pulling resistor, and the capacitors C1 and C2 are filter capacitors. An input end of the first detect unit 2121 is conductively connected to the P end and the U end of the single-phase full-bridge inverter 213, an input end of the second detect unit 2122 is conductively connected to the U end and the M end of the single-phase full-bridge inverter 213, an input end of the third detect unit 2123 is conductively connected to the P end and the V end of the single-phase full-bridge inverter 213, an input end of the fourth detect unit 2124 is conductively connected to the V end and the M end of the single-phase full-bridge inverter 213, and output ends of the first detect unit 2121, the second detect unit 2122, the third detect unit 2123 and the fourth end 2124 are a F1 end, a F2 end, a F3 end and a F4 end, respectively and are connectedly connected to the unit controller 211.

For example, the minimum operating voltage of the DC voltage $U_{PM}$ between the two ends of the capacitor C in the single-phase full-bridge inverter 213 is $U_{min}$, while the maximum operating voltage thereof is $U_{max}$. $U_{PM} \leq U_{min}$ as undervoltage of the DC voltage in the link unit is reported to the main controller 1, and $U_{PM} \geq U_{max}$ as over-voltage of the DC voltage in the link unit is reported to the main controller 1. When input voltages $U_{PU}$, $U_{UM}$, $U_{PV}$ and $U_{VM}$ of the detect unit in the fault detect circuit 212 are respectively higher than the $U_{min}$ and lower than the $U_{max}$. In the first detect unit 2121, the second detect unit 2122, the third detect unit 2123 and the fourth detect unit 2124, the photoelectric isolation modules 2125 conducts to each other, with the F1 end, the F2 end, the F3 end and the F4 end thereof outputting low level. When the input voltages $U_{PU}$, $U_{UM}$, $U_{PV}$ and $U_{VM}$ of the detect unit in the fault detect circuit 212 are lower than the $U_{min}$, In the first detect unit 2121, the second detect unit 2122, the third detect unit 2123 and the fourth detect unit 2124, the photoelectric isolation modules 2125 does not conduct to each other, with the F1 end, the F2 end, the F3 end and the F4 end thereof outputting high level. Hereinafter, the method for detect the open fault and short fault of the switch means will be described in detail, with the voltage $U_{PM}$ between the two ends of the capacitor C in the single-phase full-bridge inverter 213 being in a normal operating state.

The switch means fault detect principle in the fault detect circuit 212 proposed by the present application is as follows:

The short fault of the switch means is performed when the gate triggering impulse of the switch means is blocked. If short fault occurs on the switch means S1, the voltage $U_{PM}$ between the two ends of the capacitor C in the single-phase full-bridge inverter 213 is directly applied to the U end and the M end of the second detect unit 2122, the photoelectric isolation modules 2125 in the second detect unit 2122 is ON, and the F2 end of the second detect unit 2122 outputs low level. Similarly, if short fault occurs on the switch means S2, the F1 end of the first detect unit 2121 outputs low level; if short fault occurs on the switch means S3, the F4 end of the fourth detect unit 2124 outputs low level; if short fault occurs on the switch means S4, the F3 end of the third detect unit 2123 outputs low level. If short fault occurs on the switch means S1 and the switch means S2 of the same bridge arm in the single-phase full-bridge inverter 213 at one time, or occurs on the switch means S3 and the switch means S4 of the same bridge arm in the single-phase full-bridge inverter 213 at one time, the capacitor C in the single-phase full-bridge inverter 213 discharges, $U_{PM}$ becomes 0, resulting in under voltage in the link unit which is reported to the main controller 1. According to the state of level at the F1 end, the F2 end, the F3 end and the F4 end, other situation of the short fault of the switch means or combined short fault can be determined by whether a short fault occurs in a corresponding means.

Figure 8:
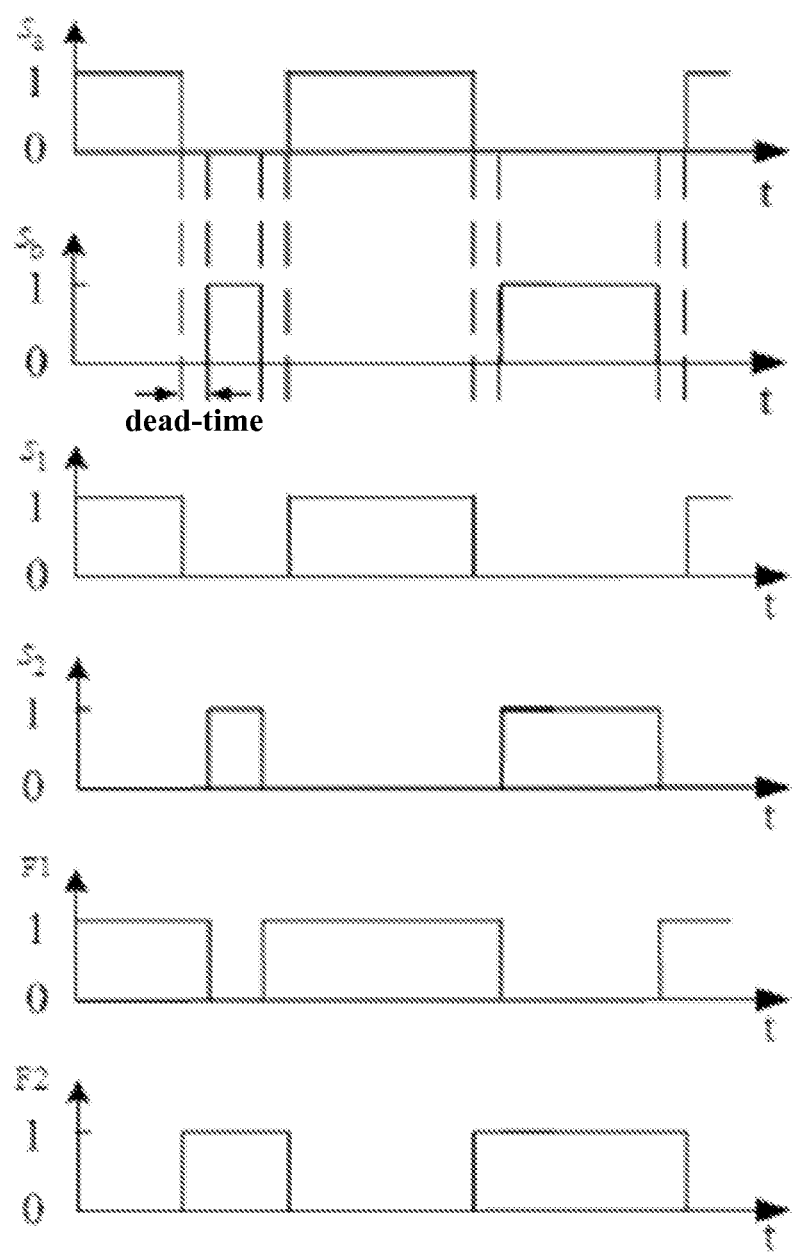
FIG. 8 is a detect waveform graph of the switch means in the embodiment of the bypass control structure of the link unit of the chain circuit active power filter according to the present application, without an open-circuit fault occurring.
Figure 9:
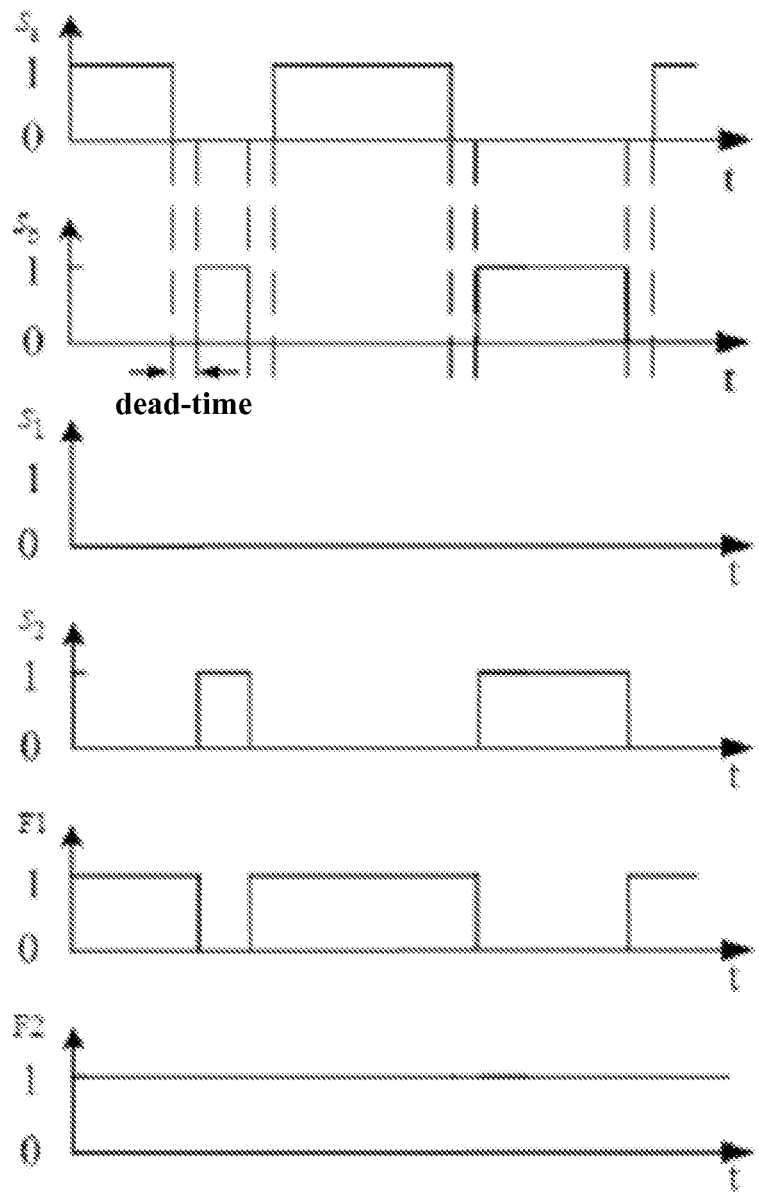
FIG. 9 is a detect waveform graph of a switch means S1 and a switch means S2 in the embodiment of the bypass control structure of the link unit of the chain circuit active power filter according to the present application, with an open-circuit fault occurring.
Figure 10:
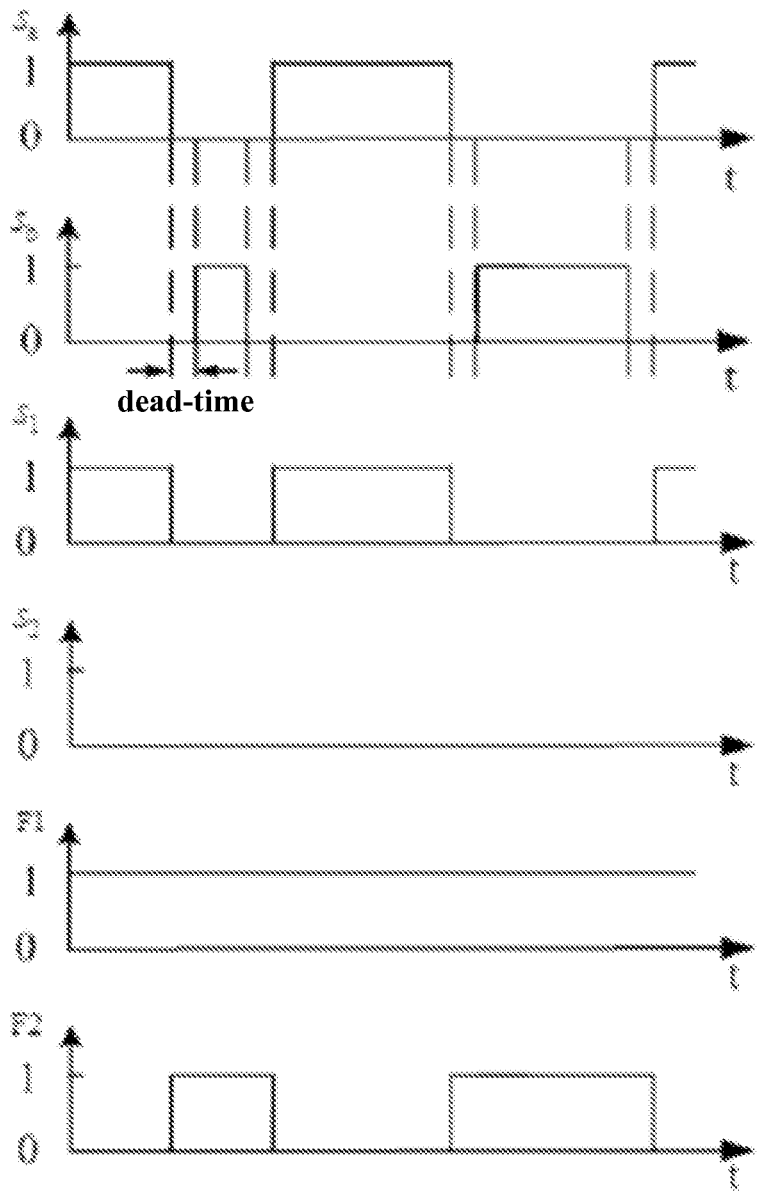
FIG. 10 is a detect waveform graph of a switch means S3 and a switch means S4 in the embodiment of the bypass control structure of the link unit of the chain circuit active power filter according to the present application, with an open-circuit fault occurring.

Open fault detect of the switch means S1 to S4 is determined when the gate triggering pulse of the switch means normally operates. In FIG. 8, a wave form of the F1 end of the first detect unit 2121 and the F2 end of the second detect unit 2122 when no open fault occurs in the first switch means S1 and the second switch means S2 is shown (since delay of the detect unit and the process of transition of ON and OFF of the switch means will not affect analyzing result of the method, during analyzing, the effect of these is not took account in), wherein if the signal of the switch means S1 and the switch means S2 is "1", it means that the switch tube is ON; if the signal of the switch means S1 and the switch means S2 is "0", it means the switch tube is OFF; if the signal of the F1 end and the F2 end is "1", it means a high level, while the signal of the F1 end and the F2 end is "0", it means a low level. As shown in FIG. 8, the high level and the low level of the signal of the F1 end are respectively corresponding to ON and OFF of the switch means S2; and the high level and the low level of the signal of the F2 end are respectively corresponding to ON and OFF of the switch means S1. FIG. 9 shows the waveform of the F1 end and the F2 end when the open fault occurs in the switch means S1. From FIG. 9, it can be seen that when the open fault occurs in the switch means S1, the signal of the F2 end is always at the high level. FIG. 10 shows that the signal of the F1 end is always at the high level when the open fault occurs in the switch means S2. Similarly, the same analyzing can be performed when the open fault occurs in the switch means S3 and the switch means S4. For the open fault of the switch means in the single-phase full-bridge inverter 213, the level state of the F1 end, the F2 end, the F3 end and the F4 end is detected and are compared with the triggering signal $S_b$, $S_a$, $S_d$ and $S_c$, and thus it can be determined whether the open fault occurs in the corresponding switch means. In this way, the open fault of the switch means can be determined in one switching cycle, achieving fast detect of the open fault of the switch means.

The unit controller 211 receives pulse signal and control command from the main controller 1, and if the link unit 21 is normal, the single-phase full-bridge inverter 213 of the link unit 21 is controlled to output compensating voltage according to the pulse signal and the control command. When a short fault or an open fault occurs in the switch means S1 to S4 of the link unit 21, after the unit controller 211 determines the fault type of the switch means of the link unit, the fault detect circuit 212 reports the information of fault to the main controller 1. The main controller sends a corresponding bypass control command to the link unit 21 according to the fault type of the switch means. The unit controller 211 reasonably controls the switch means to be ON according to the fault type of the switch means to short the output of the single-phase full-bridge inverter 213 of the link unit 21, thus bypassing the link unit 21. Alternatively, if it is necessary to perform bypass due to a DC under-voltage and over-voltage specific fault in the link unit 21, the unit controller 211 reports the fault information to the main controller 1, the main controller 1 sends a bypass command to the link unit 21 according to the fault information, the unit controller 211 reasonably controls the switch means to be ON according to the fault information to short the output of the single-phase full-bridge inverter 213 of the link unit 21, thus bypassing the link unit 21.

Figure 6:
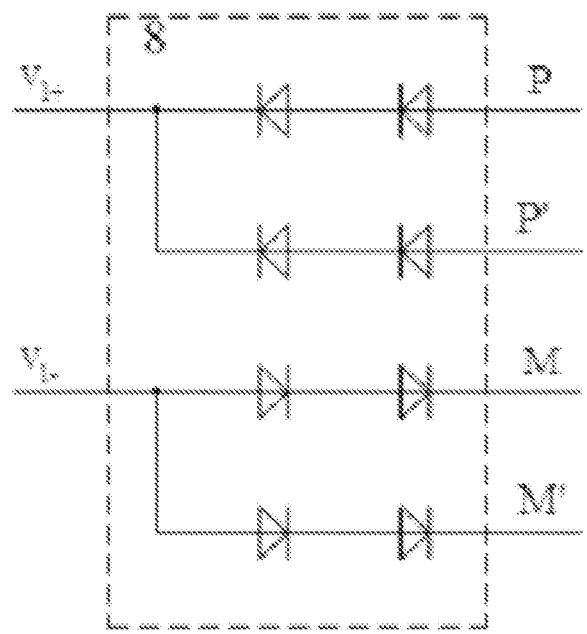
FIG. 6 is a structural schematic view of a DC coupling circuit in the embodiment of the bypass control structure of the link unit of the chain circuit active power filter according to the present application.
Figure 7:
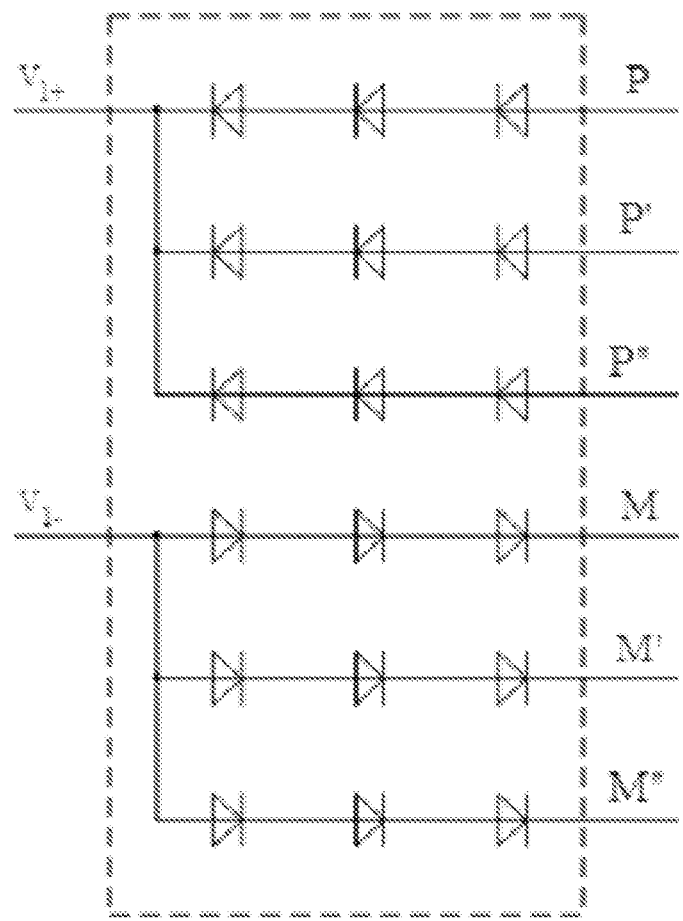
FIG. 7 is a structural schematic view of another DC coupling circuit in the embodiment of the bypass control structure of the link unit of the chain circuit active power filter according to the present application.

As shown in FIGS. 6 and 7:

According to the embodiment of the present application, A DC coupling circuit in the bypass control structure of the link unit of the chain circuit active power filter includes two sets of diodes in which two diodes positively connected in series are connected in parallel to two diodes positively connected in series, and two sets of diodes in which two diodes negatively connected in series are connected in parallel to two diodes positively connected in series (as shown in FIG. 6); wherein input ends of the two sets of diodes in which the two diodes positively connected in series are connected in parallel to the two diodes positively connected in series are respectively conductively connected to the P end of the single-phase full-bridge inverter 213 of the link unit in which such two sets of diodes are located and a P' end of the single-phase full-bridge inverter 213 of the adjacent link unit, while output ends thereof are both conductively connected to a $V_{1+}$ input end of the DC/DC power supply 214 of the link unit in which such two sets of diodes are located; and input ends of the two sets of diodes in which the two diodes positively connected in series are connected in parallel to the two diodes positively connected in series are respectively conductively connected to the M end of the single-phase full-bridge inverter 213 of the link unit in which such two sets of diodes are located and a M' end of the single-phase full-bridge inverter 213 of the adjacent link unit, while output ends thereof are both conductively connected to a $V_{1-}$ input end of the DC/DC power supply 214 of the link unit in which such two sets of diodes are located. In this way, when after the link unit 21 with the fault is bypassed, the voltage between the two ends of the capacitor C in the single-phase full-bridge inverter 213 of the link unit 21 becomes "0", the DC coupling circuit 215 supplies the voltage in the capacitor C in the single-phase full-bridge inverter 213 of the link unit 21 to the DC/DC power supply 214.

As a preferable embodiment according to the present application, the DC coupling circuit 215 includes three sets of diodes in which each set of diode includes three diodes positively connected in series and the three sets are connected in parallel, and three sets of diodes in which each set of diodes includes three diodes negatively connected in series and the three sets are connected in parallel (as shown in FIG. 7); wherein input ends of the three sets of diodes in which each set of diodes including three diodes positively connected in series and the three sets are connected in parallel are respectively conductively connected to the P end of the single-phase full-bridge inverter 213 of the link unit in which such three sets of diodes are located and a P' end and a P'' end of the single-phase full-bridge inverters 213 of the two adjacent link units, while output ends thereof are all conductively connected to a $V_{1+}$ input end of the DC/DC power supply 214 of the link unit in which such three sets of diodes are located; and input ends of the three sets of diodes in which each set of diodes including three diodes negatively connected in series and the three sets are connected in parallel are respectively conductively connected to the M end of the single-phase full-bridge inverter 213 of the link unit in which such three sets of diodes are located and a M' end and a M'' end of the single-phase full-bridge inverters 213 of the two adjacent link units, while output ends thereof are all conductively connected to a $V_{1-}$ input end of the DC/DC power supply 214 of the link unit in which such three sets of diodes are located. In this case, the input power supplied by the DC coupling circuit 215 to the DC/DC power supply 214 is more reliable.

Figure 11:
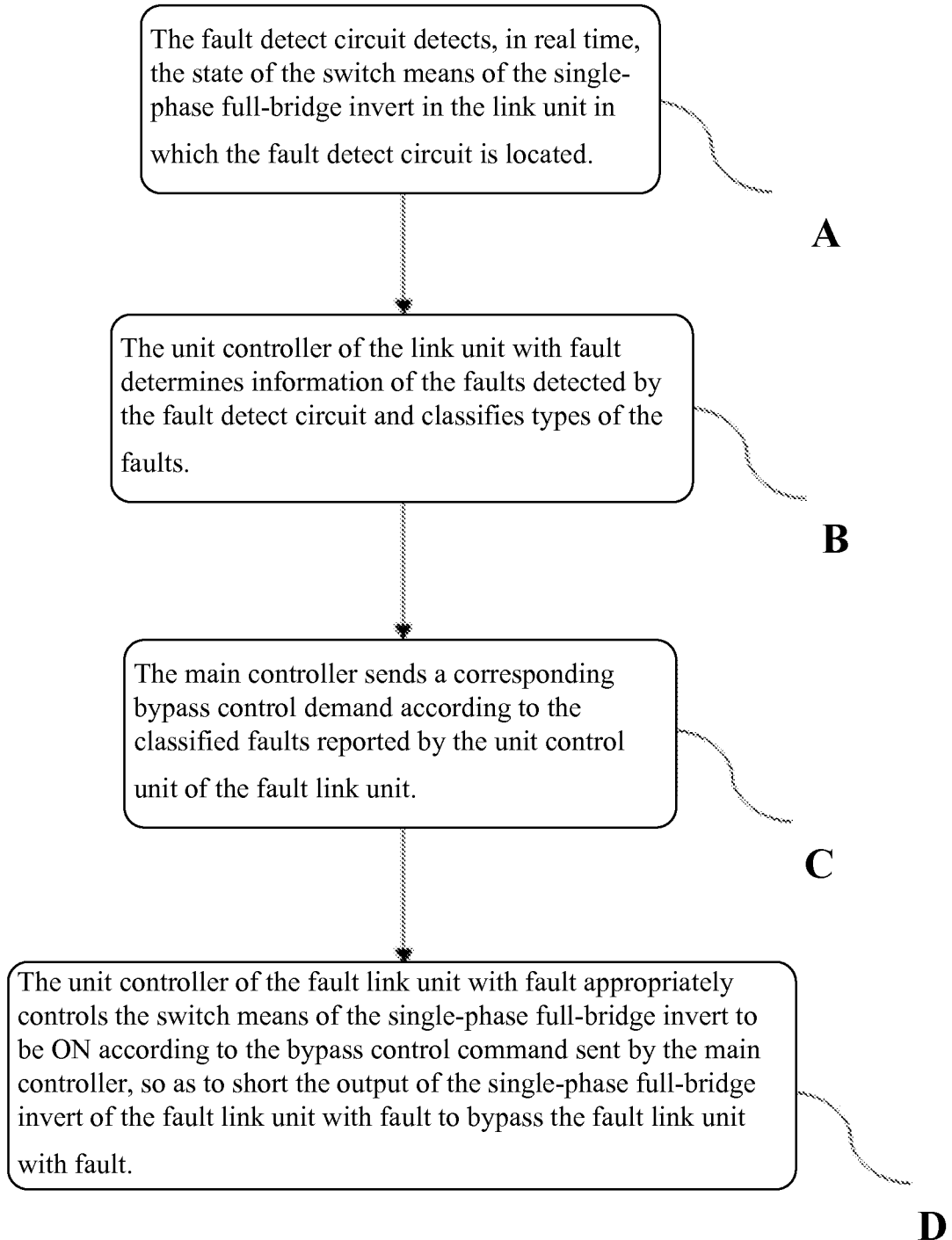
FIG. 11 is a flowchart of a control method of a bypass control structure of a link unit of the chain circuit active power filter according to the present application.

As shown in FIG. 11:

An embodiment of the present application describes a control method for a chain circuit active power filter link unit bypass control structure. In the method, a state of the switch means in each link unit 21 in a chain circuit multilevel inverter 2 of a chain circuit active power filter is detected in real time, and types of detected faults are classified so as to bypass the fault of the link unit 21 with fault by utilizing the control of the switch means without fault in the link unit 21 with fault. More specifically, the method includes the following steps:

Step A: The fault detect circuit 212 detecting, in real time, the state of the switch means of the single-phase full-bridge invert 213 in the link unit 21 in which the fault detect circuit 212 is located, and sending the detected fault information to the unit controller 211 of the link unit 21 in which the fault detect circuit 212 is located;

Step B: The unit controller 211 of the link unit 21 with fault determining information of the faults detected by the fault detect circuit 212 and classifying types of the faults, and then sending and reporting the fault type to the main controller 1;

Step C: The main controller 1 sending a corresponding bypass control demand according to the classified faults reported by the unit control unit 211 of the fault link unit 21;

Step D: The unit controller 211 of the fault link unit 21 with fault appropriately controlling the switch means of the single-phase full-bridge invert 213 to be ON according to the bypass control command sent by the main controller 1, so as to short the output of the single-phase full-bridge invert 213 of the fault link unit 21 with fault to bypass the fault link unit 21 with fault.

Specifically, the unit controller 211 of the fault link unit 21 with fault appropriately controlling the switch means of the single-phase full-bridge invert 213 to be ON according to the bypass control command sent by the main controller 1, specifically is that the unit controller 211 of the fault link unit 21 with fault sends a switch signal to the switch means without fault in the single-phase full-bridge invert 213 according to the bypass control command sent by the main controller 1, to switch on the switch means S1 and the switch means S3, or switch on the switch means S2 and the switch means S4, thus shorting the output and achieving the bypass control.

In this way, by the bypass control structure of a link unit of a chain circuit active power filter and the controller method based on such control structure, if a short or open or other specific fault occurs in any of the switch means, a bypass control can be performed in the link unit where the switch means with fault is located to ensure normal operating, stability, reliability, high efficiency of the active power filter. Therefore, the problem that the operation must be suspended until the fault is eliminated is solved without any additional bypass means; the cost and the volume are reduced and it is achieved that the time required to bypass is less than the time required to bypass by using a contactor and controllable silicon.

Of course, the control method of the present application is not only adapted to detect short or open fault of a switch means, but also to other application situation of a chain circuit multilevel convertor, for example a bypass control of a link unit, such as a synchronous compensator (STATCOM), a static var generator (SVG), a transducer or the like.

The above are the preferable embodiments of the present application. It is noted that for those skilled in the art, various improvements and retouches can be made without departing from the principle of the present application, and the improvements and retouches are considered to be fallen into the scope of protection of the present application.

What is claimed is:

1. A bypass control structure of a link unit of a chain circuit active power filter, comprising a main controller (1), a chain circuit multilevel inverter (2) for generating a compensation voltage and controlling a link unit bypass thereof, and a reactor (3) for generating a compensation current and which is connected to an external electric network; wherein the chain circuit multilevel inverter (2) comprises two or more levels of link units (21); the link units (21) each have a unit controller (211), a fault detect circuit (212), a single-phase full-bridge inverter (213), a DC/DC power supply (214) and a DC coupling circuit (215); the unit controller (211) is connected to the main controller (1), the fault detect circuit (212) and the single-phase full-bridge inverter (213); an input end of the DC coupling circuit (215) is electrically connected to two DC voltage sides of the link unit (21) in which the DC coupling circuit (215) is located, and is connected to two DC voltage sides of an adjacent link unit (21); an input end of the DC/DC power supply (214) is electrically connected to an output end of the DC coupling circuit (215), and an output end of the DC/DC power supply (214) is electrically connected to the unit controller (211) for supplying power for each components.

2. The bypass control structure of the link unit of the chain circuit active power filter according to claim 1, wherein the single-phase full-bridge inverter (213) is composed of a first switch means (S1), a second switch means (S2), a third switch means (S3) and a fourth switch means (S4), a first diode (D1), a second diode (D2), a third diode (D3) and a fourth diode (D4) and a capacitor (C); the first switch means (S1) is connected to the second switch means (S2) in series, and the third switch means (S3) to the fourth switch means (S4) in series; the first switch means (S1) and the second switch means (S2) connected in series are in parallel connected to the third switch means (S3) and the fourth switch means (S4) connected in series, and the first, second, third and fourth switch means (S1 to S4) are respectively in antiparallel connected to the first, second, third and fourth diodes (D1 to D4) in turn; wherein an end at which a collector of the first switch means (S1) is connected to a cathode of the first diode (D1) is referred to as a P end, an end at which an emitter of the second switch means (S2) is connected to an anode of the second diode (D2) is referred to as a M end, a middle point of a series circuit comprising the first switch means (S1) and the second switch means (S2) and the antiparallelly connected first diode (D1) and second diode (D2) thereof is referred to as a U end, a middle point of a series circuit comprising the third switch means (S3) and the fourth switch means (S4) and the antiparallelly connected third diode (D3) and fourth diode (D4) thereof is referred to as a V end, and the P end and the M end are respectively connected to a positive end of the capacitor (C) and a negative end of the capacitor (C), while the P end and the M end together with the U end and the V end are connected to the fault detect circuit (212).

3. The bypass control structure of the link unit of the chain circuit active power filter according to claim 2, wherein the fault detect circuit (212) comprises a first detect unit (2121), a second detect unit (2122), a third detect unit (2123) and a fourth detect unit (2124) which have the same circuit structures; each detect unit (2121 to 2124) is composed of a photoelectric isolation module (2125), a fifth diode (D5), a sixth diode (D6), a seventh diode (D7), an eighth diode (D8), a first resistor (R1), a second resistor (R2), a third resistor (R3), a fourth resistor (R4) and a first capacitor (C1) and a second capacitor (C2); the fifth diode (D5), the sixth diode (D6), the first resistor (R1) and the third resistor (R3) are conductively connected to one output a first input end of the photoelectric isolation module (2125), and a second input end of the photoelectric isolation module (2125) is conductively connected to the eighth diode (D8); both ends of the second resistor (R2), the seventh diode (D7) and the first capacitor (C1) are conductively connected to each of the first and second input ends of the photoelectric isolation module (2125) and are connected in parallel, and one end of each of the second resistor (R2) and the seventh diode (D7) is connected between the first resistor (R1) and the third resistor (R3); one end of the first capacitor (C1) is connected between the third resistor (R3) and the first input end of the photoelectric isolation module (2125); a first output end of the photoelectric isolation module (2125) is conductively connected to the fourth resistor (R4) and a second output end thereof is connected to a negative end of a working power supply of 5V; two ends of the second capacitor (C2) are conductively connected to the first and second output ends of the photoelectric isolation module (2125), respectively; wherein an input end of the first detect unit (2121) is conductively connected to the P end and the U end of the single-phase full-bridge inverter (213), an input end of the second detect unit (2122) is conductively connected to the U end and the M end of the single-phase full-bridge inverter (213), an input end of the third detect unit (2123) is conductively connected to the P end and the V end of the single-phase full-bridge inverter (213), an input end of the fourth detect unit (2124) is conductively connected to the V end and the M end of the single-phase full-bridge inverter (213), and output ends of the first detect unit (2121), the second detect unit (2122), the third detect unit (2123) and the fourth end (2124) are an F1 end, an F2 end, an F3 end and an F4 end, respectively; and the F1 end, the F2 end, the F3 end and the F4 end are conductively connected to the unit controller (211).

4. The bypass control structure of the link unit of the chain circuit active power filter according to claim 3, wherein the DC coupling circuit (215) comprises two sets of diodes in which two diodes positively connected in series are connected in parallel to two diodes positively connected in series, and two sets of diodes in which two diodes negatively connected in series are connected in parallel to two diodes positively connected in series; wherein input ends of the two sets of diodes in which the two diodes positively connected in series are connected in parallel to the two diodes positively connected in series are respectively conductively connected to the P end of the single-phase full-bridge inverter (213) of the link unit in which such two sets of diodes are located and a P' end of the single-phase full-bridge inverter (213) of the adjacent link unit, while output ends thereof are both conductively connected to a $V_{1+}$ input end of the DC/DC power supply (214) of the link unit in which such two sets of diodes are located; and input ends of the two sets of diodes in which the two diodes positively connected in series are connected in parallel to the two diodes positively connected in series are respectively conductively connected to the M end of the single-phase full-bridge inverter (213) of the link unit in which such two sets of diodes are located and a M' end of the single-phase full-bridge inverter (213) of the adjacent link unit, while output ends thereof are both conductively connected to a $V_{1-}$ input end of the DC/DC power supply (214) of the link unit in which such two sets of diodes are located.

5. The bypass control structure of the link unit of the chain circuit active power filter according to claim 4, wherein the DC coupling circuit (215) comprises three sets of diodes in which each set of diodes comprising three diodes positively connected in series and the three sets are connected in parallel, and three sets of diodes in which each set of diodes comprising three diodes negatively connected in series and the three sets are connected in parallel; wherein input ends of the three sets of diodes in which each set of diodes comprising three diodes positively connected in series and the three sets are connected in parallel are respectively conductively connected to the P end of the single-phase full-bridge inverter (213) of the link unit in which such three sets of diodes are located and a P' end and a P'' end of the single-phase full-bridge inverters (213) of the two adjacent link units, while output ends thereof are all conductively connected to a $V_{1+}$ input end of the DC/DC power supply (214) of the link unit in which such three sets of diodes are located; and input ends of the three sets of diodes in which each set of diodes comprising three diodes negatively connected in series and the three sets are connected in parallel are respectively conductively connected to the M end of the single-phase full-bridge inverter (213) of the link unit in which such three sets of diodes are located and a M' end and a M'' end of the single-phase full-bridge inverters (213) of the two adjacent link units, while output ends thereof are all conductively connected to a $V_{1-}$ input end of the DC/DC power supply (214) of the link unit in which such three sets of diodes are located.

6. A control method for a chain circuit active power filter link unit bypass control structure according to claim 1, wherein a state of a switch means in each link unit (21) in a chain circuit multilevel inverter (2) of a chain circuit active power filter is detected in real time, and types of detected faults are classified, so as to bypass a fault of the link unit (21) with fault by utilizing a control of the switch means without fault in the link unit (21) with fault.

7. The control method according to claim 6 comprising the following steps:
  a. detecting, in real time, by the fault detect circuit (212), the state of the switch means of the single-phase full-bridge invert (213) in the link unit (21) in which the fault detect circuit (212) is located;
  b. determining and classifying types of faults, by the unit controller (211) of the link unit (21) with fault, information of the faults detected by the fault detect circuit (212);
  c. sending, by the main controller (1), a corresponding bypass control demand according to the classified faults reported by the unit control unit (211) of the fault link unit (21);
  d. appropriately controlling to be ON, by the unit controller (211) of the fault link unit (21) with fault, the switch means of the single-phase full-bridge invert (213) according to the bypass control command sent by the main controller (1), so as to short the output of the single-phase full-bridge invert (213) of the fault link unit (21) with fault to bypass the fault link unit (21) with fault.

8. The control method according to claim 7, wherein the unit controller (211) of the fault link unit (21) with fault appropriately controlling the switch means of the single-phase full-bridge invert (213) to be ON according to the bypass control command sent by the main controller (1), specifically is that the unit controller (211) of the fault link unit (21) with fault sends a switch signal to the switch means without fault in the single-phase full-bridge invert (213) according to the bypass control command sent by the main controller (1), to switch on S1 and S3, or switch on S2 and S4, thus shorting the output and achieving the bypass control.

* * * * *